(12) United States Patent
Gutris

(10) Patent No.: US 6,465,922 B2
(45) Date of Patent: Oct. 15, 2002

(54) ENCLOSURE ARRANGEMENT, PARTICULARLY FOR SMALL ELECTRIC MOTORS

(75) Inventor: Giorgio Gutris, Milan (IT)

(73) Assignee: Phoenix Technologies Holding S.A. (LU)

(*) Notice: Subject to any disclaimer, the term of this patent is extended or adjusted under 35 U.S.C. 154(b) by 0 days.

(21) Appl. No.: 09/845,386

(22) Filed: Apr. 30, 2001

(65) Prior Publication Data

US 2002/0047382 A1 Apr. 25, 2002

(30) Foreign Application Priority Data

May 30, 2000 (IT) .................. MI2000U000265

(51) Int. Cl.[7] .............. H02K 5/00; H02K 5/04
(52) U.S. Cl. ....................................... 310/89
(58) Field of Search ............................... 310/89

(56) References Cited

U.S. PATENT DOCUMENTS 2,464,017 A * 3/1949 Berghorn ............... 220/691
4,801,831 A * 1/1989 Lewis ..................... 310/217

FOREIGN PATENT DOCUMENTS

| GB | 2018042 | * 10/1979 | ........... H02K/5/04 |
| JP | 55-13646 | * 1/1980 | ........... H02K/5/20 |

* cited by examiner

Primary Examiner—Burton S. Mullins
(74) Attorney, Agent, or Firm—Greer, Burns & Crain, Ltd.

(57) ABSTRACT

An enclosure arrangement for small electric motors having different heights or thicknesses of the pack of magnetic laminations thereof, which is constituted by two mutually opposite identical half-shells in which opposite ends have different depths, the half-shells being dimensioned so that the ends of the front half-shell for bearing the motor shaft passage hole, can be slidingly inserted in or on the ends of the rear half-shell to varying extents depending on the thickness of the lamination pack, while leaving the same always partially exposed.

5 Claims, 4 Drawing Sheets

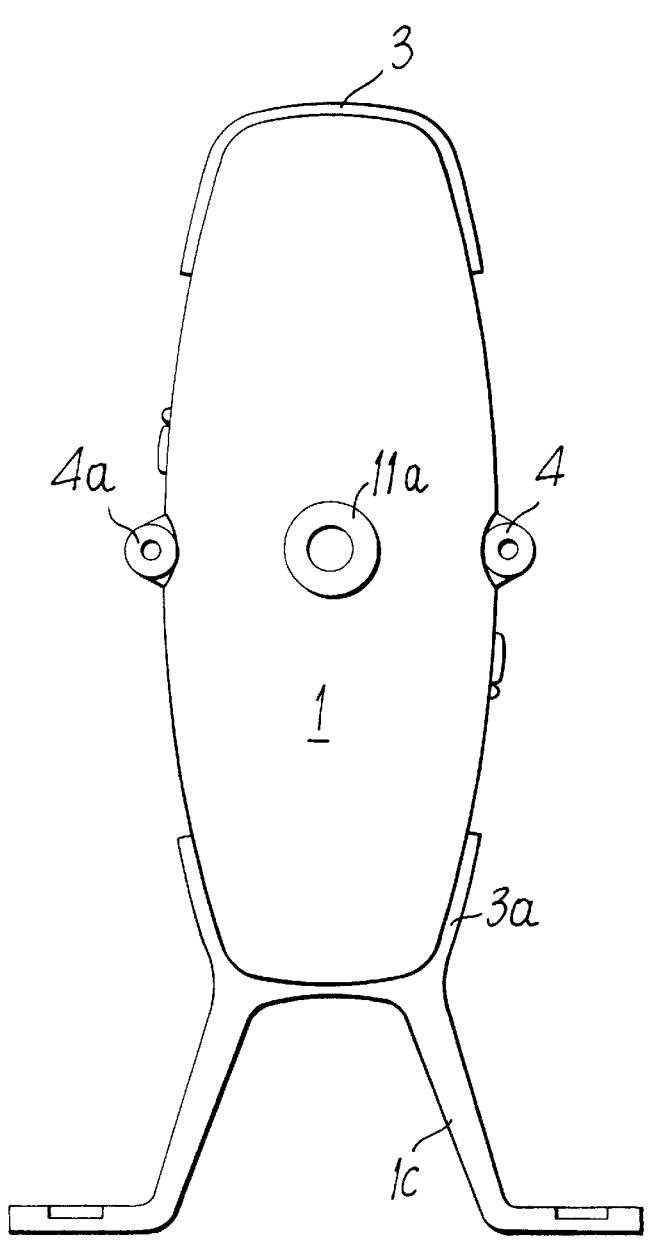
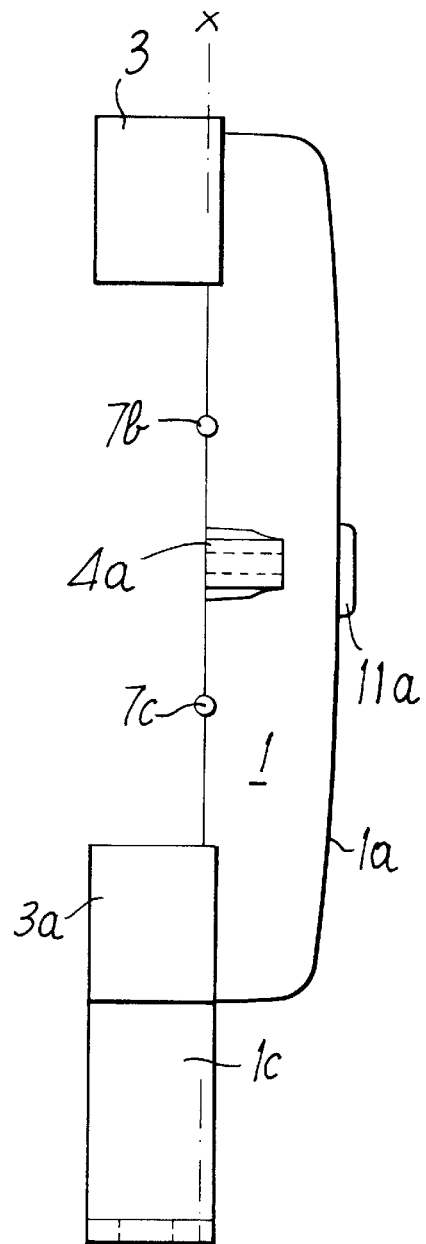
Fig. 3
Fig. 2

ENCLOSURE ARRANGEMENT, PARTICULARLY FOR SMALL ELECTRIC MOTORS

BACKGROUND OF THE INVENTION

The present invention relates to an enclosure arrangement having a substantially ellipsoidal outer shape, constituted by two opposite elements which can be adjusted with respect to each other so that they can adapt to s the various heights (thickness) of the magnetic lamination pack of a series of small electric motors normally used to drive fans, pumps and the like.

It is well-known that a single-phase electric motor is usually constituted by a stator, a rotor which is rigidly coupled to the transmission shaft, and one or more excitation coils with corresponding leads. More specifically, low-power electric motors use as their stator a pack of magnetic laminations which is generally shaped like a parallelepiped and varies in thickness within preset limits according to the characteristics required by the user devices that the motor must drive.

It is also known that said lamination pack and said motion transmission shaft are not passed through by electric current during operation and therefore can be left exposed and not protected by a containment enclosure, whereas the winding coils and the leads are always live and therefore require protection with respect to all metallic and/or ferromagnetic parts; said protection can be constituted by an enclosure or by layers of insulating material which, in certain cases, can also constitute means for supporting the leads. Said metallic parts can be shaped so as to constitute feet, flanges or the like which are suitable to rigidly couple the motor to the device that uses the motor.

Moreover, low-power electric motors are generally marketed according to different power levels according to requirements, and these different power levels are obtained, for the same series of motors, by varying the height (thickness) of the lamination pack; accordingly, if the height of the lamination pack varies, an important dimension of the motor varies, and therefore the dimension of the containment enclosure also must vary; therefore, for each height of the pack it is necessary to have enclosures having different dimensions, with evident higher costs for investment in equipment to manufacture them and greater space occupation and inventory lock-up.

Currently, enclosures for these kinds of motor are often dimensioned so as to correctly contain the motor of the type having the highest pack, using them also for motors having a lower pack, with evident disadvantages both in terms of stability of the lower-height motors inside the enclosure and in terms of greater consumption of material.

SUMMARY OF THE INVENTION

Accordingly, the aim of the present invention is to provide an enclosure arrangement for low-power electric motors which is conceived and structured so as to fully obviate the above mentioned requirements and, more specifically, is such as to allow to protect with a single enclosure, both a motor with the lowest pack and a motor with the highest pack, thus is ensuring in any case maximum stability of the engagement between the enclosure and the motor.

An object of the invention is to provide an enclosure arrangement of the type with two elements or shells which are opposite to each other and mutually adjustable, each element being provided with openings which allow to leave when the enclosure is closed, the pack of magnetic laminations visible regardless of the height of the pack provided in a given series of motors.

Another object is to provide a protective enclosure arrangement for low-power electric motors which is externally provided with means for coupling the motor to a user device or to other supports, and also with seats suitable for the protrusion of the motor shaft from the enclosure and of the connector or cable that carries current to the windings.

Another object is to provide a protective enclosure arrangement for said motors which has a particularly pleasant outer shape and is highly effective in terms of distinctiveness.

This aim and these and other objects which will become better apparent hereinafter are achieved by an enclosure arrangement with mutually detachable elements, suitable for an entire series of small electric motors having different heights or thicknesses of the pack of magnetic laminations used, said enclosure being constituted, according to the present invention, by two half-shells or domes having a substantially ellipsoidal shape and provided with opposite identical cavities and with opposite ends that have different depths, a flat rectangular band being associated with the peripheral edge of one of said half-shells, or front half-shell, said band protruding from said edge and being interrupted in its central part in order to leave exposed the lamination pack enclosed between the two half-shells and create two mutually opposite band portions which are suitable to allow the opposite ends of the other half-shell, or rear shell, to be inserted slidingly under said band portions, so as to allow the rear half-shell to move with respect to the front half-shell in the case of lamination packs having different heights and up to the maximum height allowed by the provided series of motors, at least one of said half-shells further having means for anchoring the motor, enclosed and locked within the enclosure, to the user devices, seats for the passage of the motor shaft outside the enclosure, of the power connector or of the electric power supply cable, and seats for the ball bearings or other bearings that support the rotor.

More particularly, on the longitudinal arc-like edges of the two half-shells or covers rounded tabs are formed which are adapted to lock within corresponding slotted seats provided in the lamination pack, in order to ensure perfect closure positioning of the two half-shells with respect to the motor they protect, also compensating for any height tolerances of the lamination pack.

BRIEF DESCRIPTION OF THE DRAWINGS

Further characteristics and advantages of the present invention will become better apparent from the following detailed description thereof, given with reference to the accompanying drawings, which are provided only by way of non-limitative example and wherein:

FIG. 2 is another side view of the cover or front half-shell of the enclosure arrangement of FIG. 1 from which the motor shaft protrudes; said cover has, according to another embodiment, a system for resting the motor on two feet;

FIG. 3 is a front view of the same front cover as in FIG. 2, with its feet divaricated;

DESCRIPTION OF THE PREFERRED EMBODIMENTS

Figure 1:
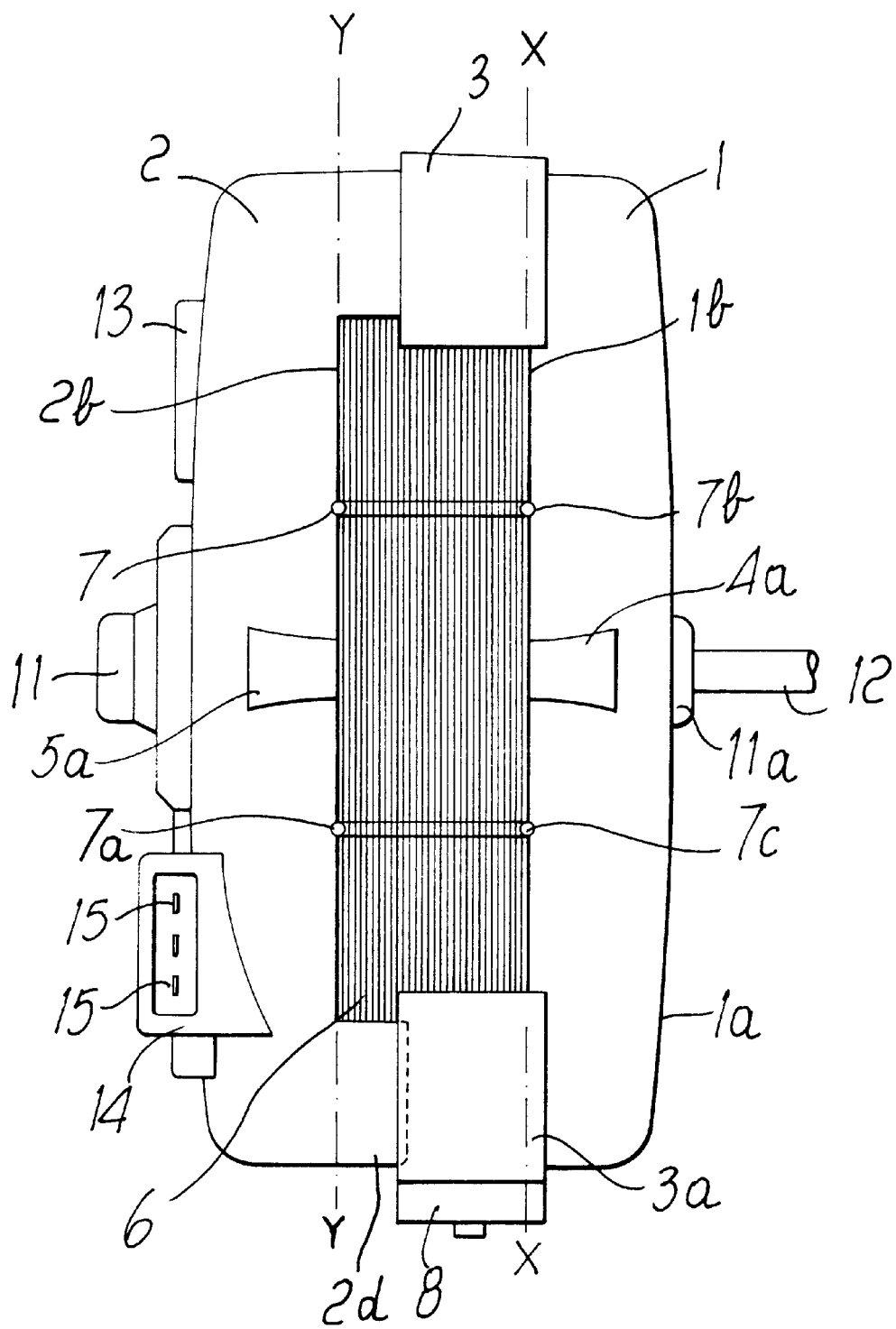
FIG. 1 is a side view of a complete enclosure arrangement provided, according to the invention, fitted on an electric motor and leaving visible a lamination pack having the maximum height provided by the series, and having, according to a first embodiment, a flat resting base.

With reference to the figures, the enclosure arrangement is essentially constituted by two half-shells which are substantially ellipsoidal and can be mutually mated frontally, so as to form a hollow protective body for a series of low-power electric motors. More specifically, said enclosure is constituted by a front half-shell or cover 1 and by a similar rear half-shell 2; both of which are shaped like a tray with a bottom 1a and 2a, respectively, which is substantially ellipsoidal; as clearly shown in FIGS. 1 and 2, the edge 1b of the front half-shell 1, is contained within the line X—X, while the upper edge 2b of the rear half-shell 2 is contained within the line Y—Y and has, at its opposite ends, two identical extensions 2c–2d.

Figure 6:
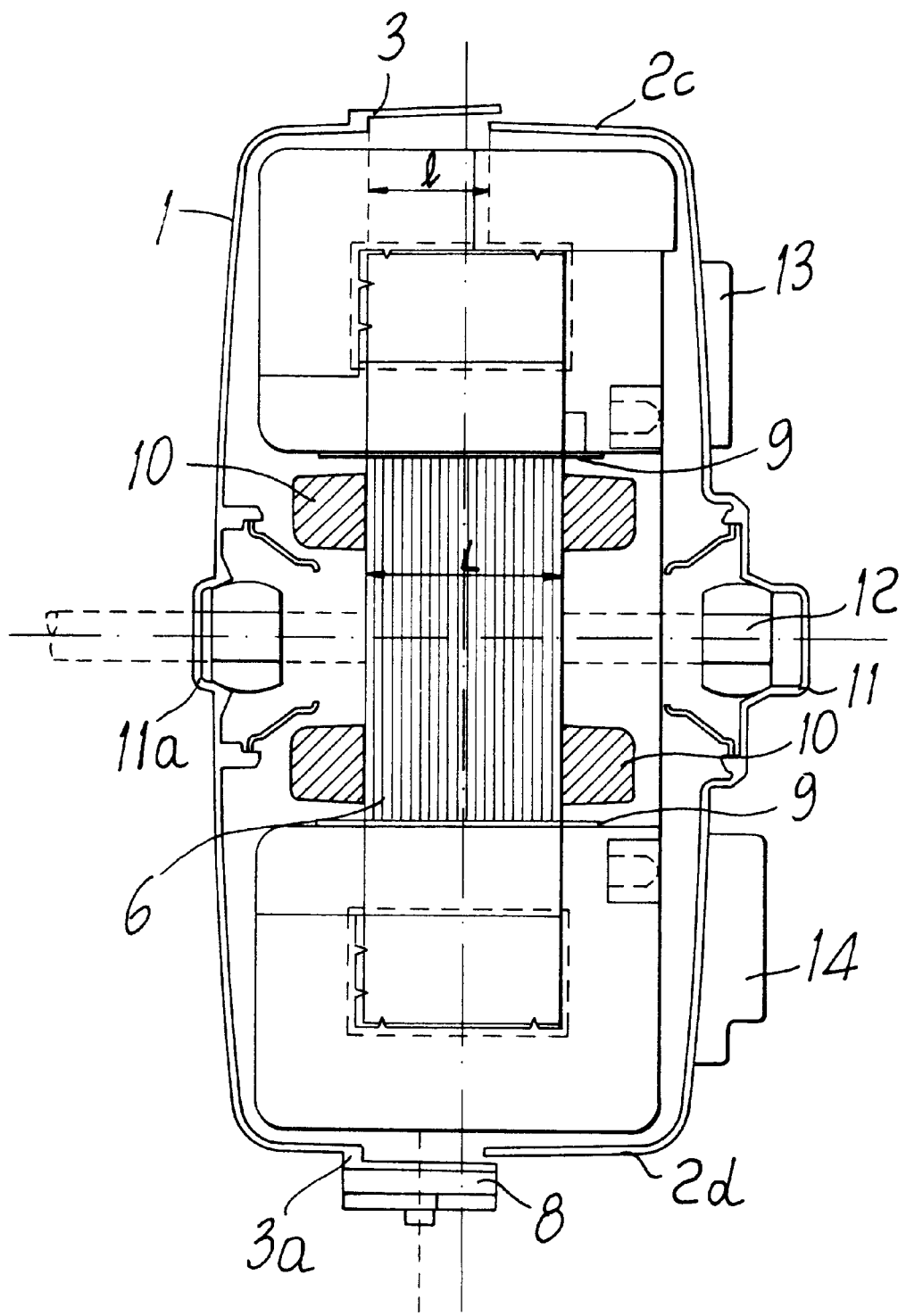
FIG. 6 is a cutout view of FIG. 1, illustrating the inside of the enclosure arrangement executed according to the invention and containing the electric motor during the insertion by overlapping of the ends of the rear half-shell in the ends of the front shell.

Two portions of a rectangular band, designated by the reference numerals 3–3a in the figures, are further associated with the outer surface of the two opposite arc-like ends of the front half-shell 1, protrude from the plane X—X of the edge of said half-shell and are dimensioned so as to internally accommodate said extensions 2c–2d which protrude from the rear half-shell 2; accordingly, as clearly shown in FIG. 6, the ellipsoidal extensions 2c–2d of the rear half-shell 2 can be inserted under the band portions 3–3a of the front half-shell 1 until they make contact, on the line X—X, with the edge of the front half-shell 1.

Figures 4, 5:
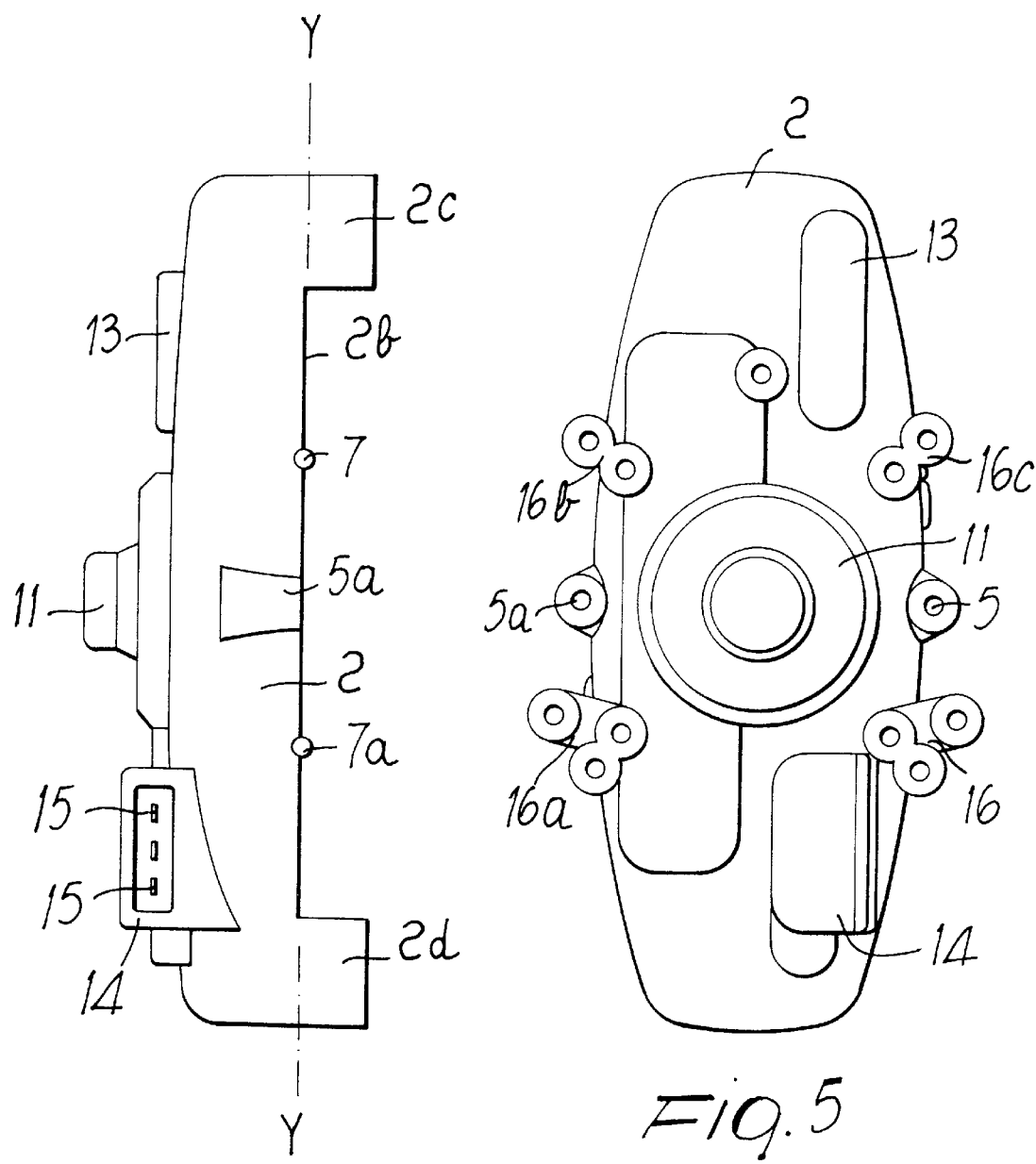
FIG. 4 is a side view of the other cover (or rear half-shell of the enclosure), which is provided with the seats for the passage of the power connector and with the three leads which are suitable to receive the current and carry it to the windings of the motor.
FIG. 5 is a front view of the rear half-shell of FIG. 4, illustrating the various lug-shaped seats used to fasten the two half-shell and the bosses for fixing the enclosure containing the motor to fixed supports or to a user device.

Accordingly, it is possible to enclose in the two half-shells lamination packs having different heights or thicknesses, within the limits defined by the width of said band portions, simply by abutting the opposite straight edges of the lamination pack against the edges 1b–2b of the half-shells and locking them by means of bolts or screws inserted within lugs or bosses which protrude from the outer faces of the two half-shells and are designated by the reference numerals 4–4a in the front half-shell 1 (FIG. 3) and by the reference numerals 5–5a in the rear half-shell 2 (FIG. 5). FIG. 1 illustrates an enclosure according to the invention, in which a pack of laminations 6 having the maximum height or thickness provided in a given series of motors is inserted and protected.

Essentially, as shown by FIG. 6, the lamination pack 6 which is enclosed between the two half-shells 1 and 2 and has a maximum height "L" can be reduced to a height "1", with evident practical and economic advantages.

The enclosure arrangement with two opposite shells has, according to one of its possible embodiments, resting feet 1c, as shown in FIGS. 2 and 3, or a base 8, as shown in FIGS. 1 and 6; moreover, in the arc-like edges 1b and 2b of the two half-shells protruding teeth or tabs 7–7a and, respectively, 7b–7c are formed, which interlock in corresponding slotted seats 8a–8b formed in the faces of the lamination pack 6, as clearly shown in FIGS. 1–2–4, thus ensuring perfect positioning of the two half-shells with respect to the motor enclosed between said half-shells.

Furthermore, said opposite half-shells 1 and 2 can have, inside them and in axial alignment with the circular hole 9 formed in the lamination pack (FIG. 6) and meant to contain the rotor 10, seats for the ball bearings or other bearings 11 and 11a (FIG. 6) suitable to support the motor shaft 12 that protrudes from the front half-shell 1.

Likewise, also according to the invention, in one or both of said half-shells or covers it is possible to provide chambers which protrude outward, such as for example the one designated by the reference numeral 13 in FIGS. 1–4 and 5, which is dimensioned so as to accommodate protruding parts of the motor without requiring an increase in the overall dimensions of the half-shells.

Furthermore, in one half-shell, for example the rear one, it is possible to form a suitable seat 14 (FIGS. 1 and 4) for the passage of a connector which is meant to supply the leads 15 of the electrical part of the motor; likewise, it is possible to form, in one half-shell, a hole (not shown in the figures) for the passage of a cable which carries the power supply current to the motor.

Finally, said two half-shells 1 and 2 can be given exactly identical shapes and dimensions, thus allowing their respective longitudinal edges 1b and 2b to mate without leaving exposed the pack of magnetic laminations enclosed between them. Furthermore, if cooling is required, fins or the like can be applied to the outer surface of said half-shells.

The ellipsoidal structure of the enclosure as described above and as illustrated by way of example can be made of aluminum, alloys thereof or other metallic alloys, as well as of rigid plastics, whereas lugs or bosses 16–16a–16b–16c (FIG. 5) can be formed or applied in one or both of said halfshells for the stable anchoring of the enclosure, that contains the motor, to various supports, to a wall or the like.

In practice the dimensions of the substantially ellipsoidal outer shape of said half-shell, the materials used and the color may vary according to requirements without abandoning the scope of protection of the appended claims.

The disclosures in Italian Utility Model Application No. MI2000U000265 from which this application claims priority are incorporated herein by reference.

What is claimed is:

1. An enclosure arrangement with mutually detachable elements, for supporting and protecting a preset series of electric motors provided with a shaft, electric connectors, leads, supporting bearings and having different heights and thicknesses of magnetic lamination packs thereof, the enclosure arrangement comprising: two half-shells comprising a front half-shell and a rear half-shell, shaped as domes having a substantially ellipsoidal shape and provided with mutually opposite identical cavities and with opposite ends that have different depths; a flat rectangular band associated with a peripheral edge of the front half-shell, said band protruding from said edge and being interrupted in a central part thereof in order to leave exposed the lamination pack enclosed between the two half-shells, thereby forming two mutually opposite band portions; protruding ends of the rear shell, protruding from an edge thereof for insertion under said band portions of the front edge, so as to allow abutting of the edge of the rear half-shell against the peripheral edge of the front half-shell provided with said band portions, upon accommodation of lamination packs, between the two half-shells, which have a minimum height, and so as to further allow the rear half-shell to move away, with respect to the front half-shell, to accommodate lamination packs having heights varying from the minimum height up to a maximum height of the preset series of motors; anchoring means, provided on at least one of said half-shells for anchoring the motor, enclosed and locked within the enclosure arrangement, to a user device; seats for providing passage of the motor shaft and of the electric connectors outside the enclosure arrangement, to the leads of the motor; and bearing seats for the motor bearings or other bearings that support the rotor.

2. The enclosure arrangement of claim 1, further comprising rounded tabs shaped as protruding teeth provided at longitudinal arc-like parts of said edges of said two half-shells, and corresponding slotted seats in which said teeth interlock, said slotted seats being formed by blanking in the lamination pack, in order to ensure perfect closure positioning of the two half-shells with respect to the motor protected.

3. The enclosure arrangement of claim 1, wherein said two half-shells comprise: any of a bolt and screw fixing means; lugs protruding from the half shells; and holes formed coaxially in said lugs, said fixing means being inserted in said holes formed coaxially in lugs which protrude outward from both of said half-shells.

4. The enclosure arrangement of claim 1, wherein said two half-shells are locked to each other by snap-acting couplings.

5. The enclosure arrangement of claim 2, further comprising two divaricated feet for resting the protected motor, which are arranged at ends of said front half-shell and rigidly connected to the one of said band portions associated therewith.

* * * * *